US012311429B2

(12) United States Patent
Degliesposti et al.

(10) Patent No.: US 12,311,429 B2
(45) Date of Patent: May 27, 2025

(54) SEALING MACHINE AND RELATED CONTROL METHOD

(71) Applicant: G.D S.p.A., Bologna (IT)

(72) Inventors: Paolo Degliesposti, Bologna (IT); Luca Mariani, Bologna (IT); Vincenzo Ponticelli, Bologna (IT); Giampaolo Gianese, Bologna (IT); Luca Testoni, Bologna (IT); Luca Lanzarini, Bologna (IT)

(73) Assignee: G.D S.p.A., Bologna (IT)

( * ) Notice: Subject to any disclaimer, the term of this patent is extended or adjusted under 35 U.S.C. 154(b) by 0 days.

(21) Appl. No.: 17/963,458

(22) Filed: Oct. 11, 2022

(65) Prior Publication Data

US 2023/0113494 A1 Apr. 13, 2023

(30) Foreign Application Priority Data

Oct. 12, 2021 (IT) ........................ 102021000026087

(51) Int. Cl.

| | |
|---|---|
| ***B67B 3/00*** | (2006.01) |
| ***B21D 51/46*** | (2006.01) |
| ***B67B 3/12*** | (2006.01) |
| ***B67B 3/20*** | (2006.01) |
| ***B67B 3/26*** | (2006.01) |
| ***B67B 3/28*** | (2006.01) |
| ***B67B 5/03*** | (2006.01) |
| *B67B 3/16* | (2006.01) |

(52) U.S. Cl.

CPC ................ *B21D 51/46* (2013.01); *B67B 3/12* (2013.01); *B67B 3/2013* (2013.01); *B67B 3/208* (2013.01); *B67B 3/2093* (2013.01); *B67B 3/26* (2013.01); *B67B 3/28* (2013.01); *B67B 5/032* (2013.01); *B67B 3/16* (2013.01)

(58) Field of Classification Search

CPC ......... B21D 51/46; B67B 3/12; B67B 3/2013; B67B 3/208; B67B 3/2093; B67B 3/26; B67B 3/28

See application file for complete search history.

(56) References Cited

U.S. PATENT DOCUMENTS 4,221,105 A * 9/1980 Guest ........................ B67B 3/18 53/488

5,239,136 A * 8/1993 Chiari ........................ B67B 1/04 177/50

(Continued)

FOREIGN PATENT DOCUMENTS

EP 2923996 B1 11/2016

OTHER PUBLICATIONS

Italian Search Report dated Jun. 1, 2022. 8 pages.

*Primary Examiner* — Andrew M Tecco

(74) *Attorney, Agent, or Firm* — RMCK Law Group PLC

(57) ABSTRACT

A sealing machine and method for controlling a sealing machine Includes the following steps: placing capped containers provided with a seal on plates, rotating the plates, pressing the seal against the cap of the container and fastening said seal using a sealing head. The step of rotating the plates is performed by rotating each plate independently of the other plates. The method further includes: detecting at least one parameter associated with the rotation of a plate and/or with a compression load between each sealing head and the seal, and comparing the value of the detected parameter with a reference range.

3 Claims, 3 Drawing Sheets

(56) References Cited

U.S. PATENT DOCUMENTS

| | | | | | |
|---|---|---|---|---|---|
| 5,321,935 | A * | 6/1994 | Spatz | B67B 3/208 | 53/53 |
| 6,150,785 | A * | 11/2000 | Butscher | H02H 7/0851 | 318/282 |
| 6,874,301 | B2 * | 4/2005 | Kitamoto | B67B 3/26 | 53/484 |
| 6,948,297 | B2 * | 9/2005 | Kitamoto | B67B 3/2093 | 53/317 |
| 7,204,151 | B2 * | 4/2007 | Kitamoto | B67B 1/04 | 53/484 |
| 8,256,188 | B2 * | 9/2012 | Blumenstock | B65B 7/285 | 53/286 |
| 2001/0018820 | A1 * | 9/2001 | Kitamoto | B67B 3/20 | 53/331.5 |

* cited by examiner

SEALING MACHINE AND RELATED CONTROL METHOD

CROSS-REFERENCE TO RELATED APPLICATION

This application claims priority to Italian Patent Application No. 102021000026087 filed Oct. 12, 2021. The disclosure of the above application is incorporated herein by reference in its entirety.

FIELD AND BACKGROUND

The present invention pertains to the technical sector of sealing machines.

More specifically, the present invention relates to a sealing machine and to a method for controlling a sealing machine.

Automatic machines for capping containers (such as flasks and bottles) that have been filled with a product (liquid or powder) with a cap, usually made of rubber or silicone, are known, for example in the pharmaceutical sector.

After the capping operation, the containers are conveyed to a sealing machine, having first been provided with a metal capsule referred to as a seal (usually made of aluminum) on the previously applied cap. Said seals are fastened to ensure that each container is closed until the container is opened.

A known sealing machine has a carousel with a vertical axis and a plurality of individual positions paired with support plates for the capped containers to which the seals will be fastened.

The carousel includes a plurality of sealing heads arranged above the support plates, each sealing head having an idle stop designed to press the seal against the cap of the container. Each sealing head also has one or more sealing blades that are moveable between an idle position in which said blades are not in contact with the seal of the corresponding container, and an operating position in which said blades are in contact with the seal of the corresponding container, to fasten the seal to the container.

The support plates are moveable in rotation by common moving means so that each container rotates about its own vertical axis. This enables the sealing blades to act on the entire circumference of the seal, folding the related peripheral edge about the neck of the container. The plates are also moveable vertically in translation to lift the container and to bring each cap of the container into contact with the idle stop of the corresponding sealing head.

According to an alternative, a sealing station is provided in a machine for filling and capping containers. For the sake of simplicity, reference shall henceforth be made to a sealing machine.

However, such sealing machines often do not guarantee optimal sealing quality, jeopardizing the safety of the product inside the container. This is also a result of the variety of products to be packaged, i.e. the type of container, cap and seal, that can be fed to the same machine.

OBJECT AND SUMMARY

The present invention is therefore intended to resolve the aforementioned drawbacks.

This objective is achieved by a sealing machine and a method for controlling a sealing machine according to the attached claims.

Advantageously, the machine and the method according to the invention enable an optimal sealing operation for each container, i.e. said machine and method enable each seal to be optimally fastened to the related container.

BRIEF DESCRIPTION OF THE DRAWINGS

Other advantageous aspects are described in greater detail below with reference to the attached drawings, in which.

DESCRIPTION

Figure 1:
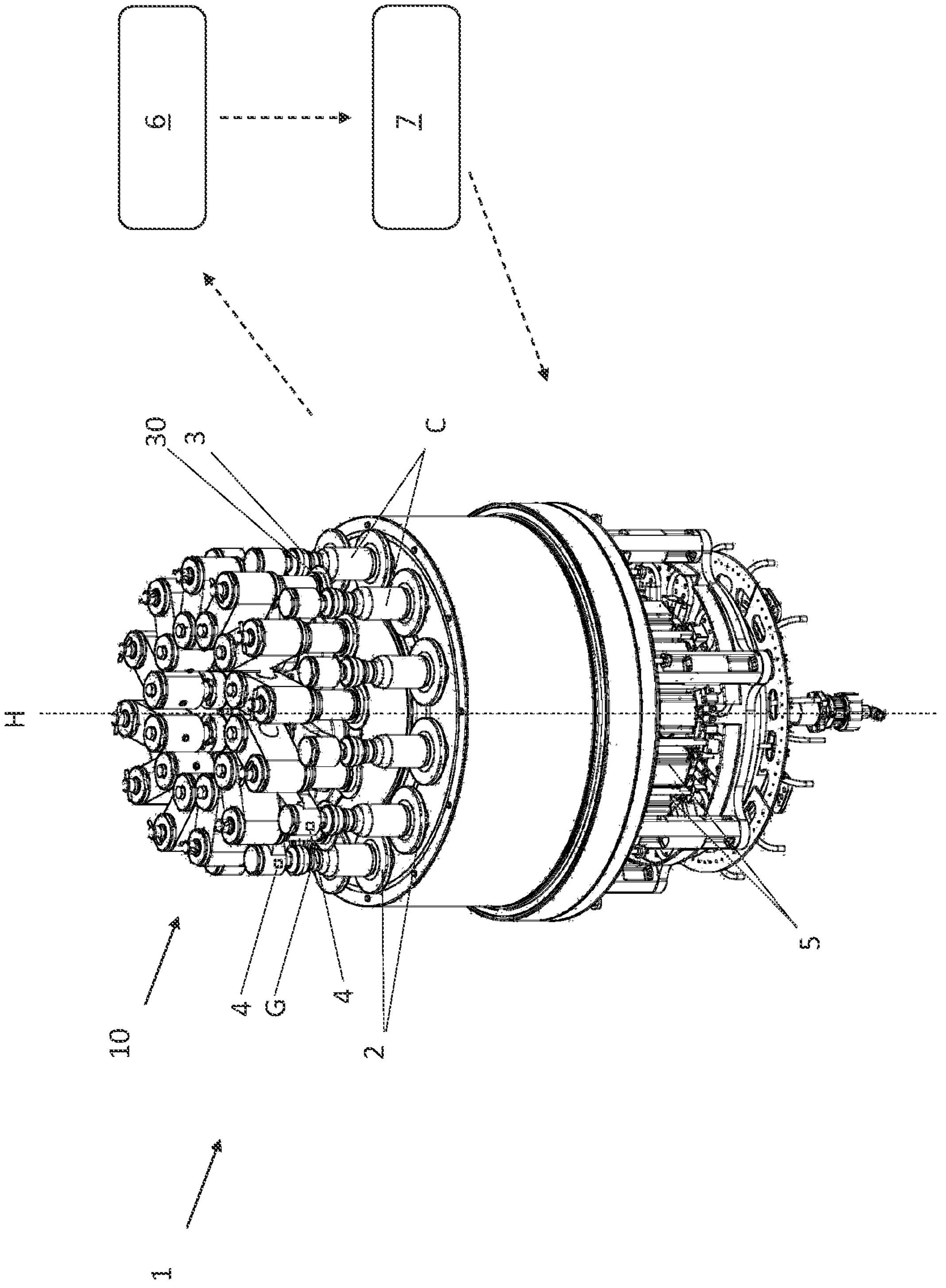
FIG. 1 is a perspective view of a machine according to the invention.
Figure 2:
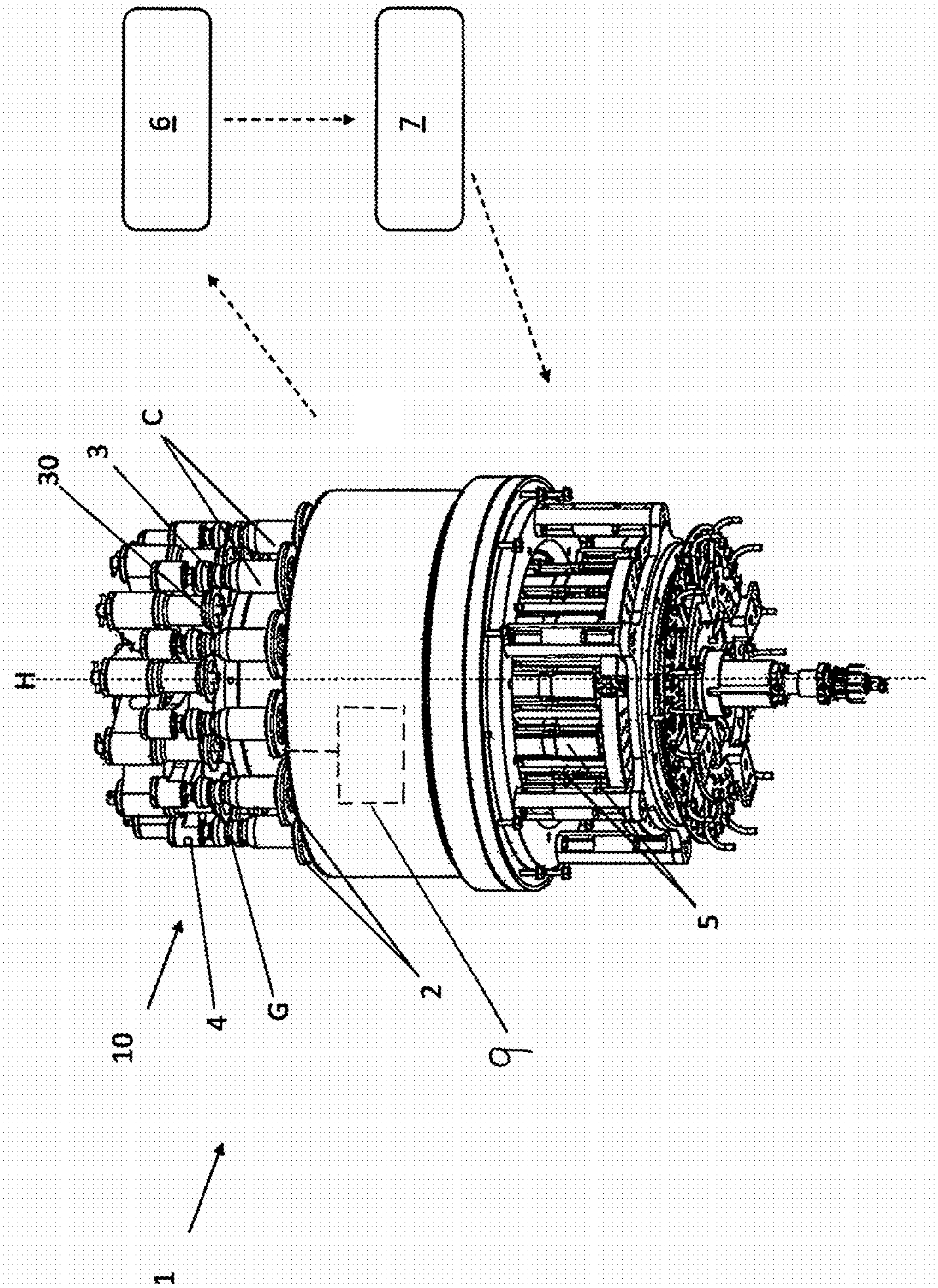
FIG. 2 is a perspective view, different from the view in FIG. 1, of a machine according to the invention.

The sealing machine according to the present invention is indicated with reference sign 1 in FIGS. 1 and 2.

The sealing machine 1 according to the present invention preferably has a carousel 10 that is rotatable about a vertical axis H and that includes a plurality of support plates 2 that are rotatable about themselves and are designed to carry containers C previously provided with a cap (i.e. closed) and seal G (placed on the cap, but not yet fastened). A container C provided with a cap and with a seal G fastened thereto is shown by way of example in FIG. 3.

According to an alternative that is not shown, a sealing station is provided in a machine for filling and capping containers. For the sake of simplicity, reference shall henceforth be made to a sealing machine, meaning a machine that has at least one sealing station.

According to a further alternative, the seal can be fed to the containers only once the containers have been positioned on the support plates (not shown).

The machine 1 also includes a plurality of sealing heads 3, 30 to press a seal G against a cap of a container C when said container is positioned on a support plate 2, and to fasten the seal G on the container C.

Figure 3:
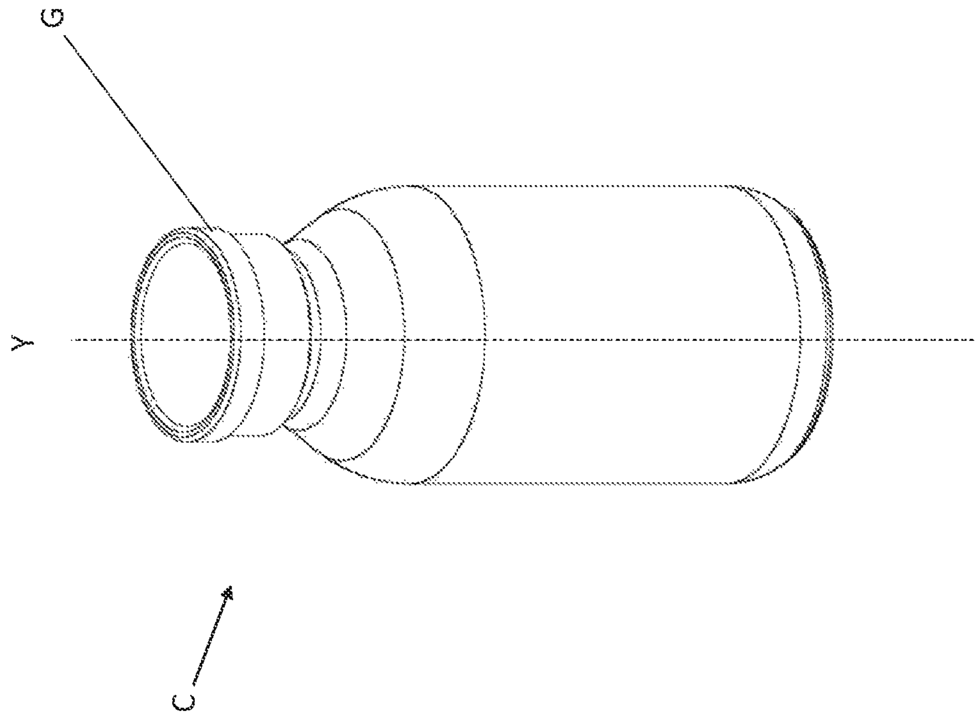
FIG. 3 is a magnified perspective view of a container provided with a cap and an applied seal.

The machine 1 also includes moving means 5 for the support plates 2 to rotate the plates 2 about themselves (i.e. to rotate the containers C about the vertical axis Y of said containers, see FIG. 3).

In particular, the moving means 5 are designed to rotate the supporting plates 2 independently of each other.

In particular, the machine 1 also includes a detection and control unit 6 (shown schematically in FIGS. 1 and 2) that is designed to detect at least one operating parameter associated with the rotation of each support plate 2 and/or with the compression load between each sealing head 3, 30 and the corresponding seal G, and to compare the value of the detected parameter with a reference value or range of reference values.

Advantageously, the operation carried out by the detection and control unit 6 to detect at least one operating parameter associated with the rotation of each support plate 2 and/or the compression load enables sealing to be optimized (i.e. optimum fastening of a seal G on the related container C).

As mentioned in the introduction to the present document, the variety of products to be packaged, i.e. the types of containers C, caps and seals G, may require different specifications to optimize the sealing operation. Consequently, where the detection and control unit 6 detects that the value of the detected parameter does not match the value of the reference parameter or does not fall within a range of reference values, the actions detailed below can be taken.

The flow of information between the sealing machine 1 and the detection and control unit 6 is shown by way of example in FIGS. 1 and 2 using dashed arrows.

According to the preferred embodiment, the machine 1 includes further means for sending a signal (for example acoustic and/or visual) (not shown) if the value of the detected parameter is different from the reference value or the range of reference values.

In particular, once a signal has been sent, the machine 1 can be stopped, or alternatively the rotation of a support plate 2 and/or the compression load between each sealing head 3, 30 and the corresponding seal can be adjusted.

If the machine 1 is stopped, this operation can be performed manually by an operator or automatically. In this latter case, the machine can be stopped by the detection and control unit 6.

If alternatively the aforementioned adjustment method is used, the machine 1 can also have an adjustment unit 7 (shown schematically in FIGS. 1 and 2) that is connected to the detection and control unit 6 and designed to adjust the rotation of a support plate 2 and/or the compression load between each sealing head 3, 30 and the corresponding seal G if the value of the detected parameter is different from the reference value or the range of reference values.

The flow of information between the sealing machine 1 and the detection and control unit 6 and the adjustment unit 7 is shown by way of example in FIGS. 1 and 2 using dashed arrows.

The detection and control unit 6 and the adjustment unit 7 can be integral with one another such as to form a single processing unit (not shown).

According to the embodiment described above, if the detection and control unit 6 detects a parameter associated with a plate 2 that is different from the reference value or the range of reference values, the adjustment unit 7 can act on the corresponding electric motor 5 to adjust the rotational speed thereof such as to optimize the sealing operation.

According to the preferred embodiment, the moving means 5 are an electric motor 5 (shown partially in FIGS. 1 and 2) for each support plate 2 and the detection and control unit 6 is connected to each electric motor 5. In this case, each electric motor 5 determines the rotation of each plate 2, i.e. of each container C, determining the rotational speed (or sealing speed) and the number of rotations required to fasten the seal G to the container C (i.e. to complete the sealing operation).

According to this embodiment, for adjustments in which the detection and control unit 6 detects a parameter associated with a plate 2 that is different from the reference value or the range of reference values, the adjustment unit 7 acts on the corresponding electric motor 5 to adjust the rotational speed thereof such as to optimize the sealing operation.

Each sealing head 3, 30 can also have one or more sealing blades 30 that are moveable between an idle position in which said blades are not in contact with the seal G (i.e. are separated from the seal G) of the corresponding container C, and an operating position in which said blades are in contact with the seal G of the corresponding container C, to fasten the seal G to the container C during rotation of the container C. Each sealing blade 30 is moved to the related operating position once the container C has been rotated by the related support plate 2. Preferably, the movement of each sealing blade 30 between the two aforementioned positions is driven by cams (not shown).

Preferably, each sealing blade 30 can be associated with elastic means (not shown in the attached figures) to prevent overloading during the sealing operation.

The machine 1 according to the invention enables the rotational speed of the support plates 2 to be adjusted during the sealing operation, for example by rotating a support plate 2 (and therefore the related container C) at a first speed when the related sealing blade 30 is moved from the related idle position to the operating position, and increasing the rotational speed to a second speed greater than the first speed once the sealing operation has been started. This helps to reduce the particulate matter caused by the blade dragging against the corresponding seal.

According to one embodiment, the operating parameter detected by the detection and control unit 6 is the compression load between each sealing head 3, 30 and the corresponding seal G, as explained below.

Preferably, each sealing head 3, 30 has an idle stop 3 that is rotatable about itself, to press the seal G against the cap of a container C when said container is placed on a support plate 2. Each sealing head 3, 30 can include (or be associated with) a load cell 4. In particular, the load cell 4 is preferably associated with the idle stop 3 of each sealing head 3, 30. According to this embodiment, the detection and control unit 6 is connected to each load cell 4. The position of the load cell 4 is shown schematically in FIGS. 1 and 2.

This makes it possible to determine the compression load between each sealing head 3, 30 and the corresponding seal G, and therefore whether the seal G is being properly pressed during the sealing operation.

Preferably, the load cell 4 is built into the idle stop 3 (or into a support element thereof) such as to be axially aligned with the container against the cap of the respective container C when said container is positioned on the support plate 2.

According to the preferred embodiment, the support plates 2 are also moveable vertically in translation (in opposing directions) to lift the container C towards the related idle stop 3 and to bring each cap of the container C provided with a seal G into contact with the idle stop 3 of the corresponding sealing head 3, 30 (and vice versa) before each support plate 2 is rotated about itself. Preferably, the vertical translational movement of the support plates 2 is cam-driven (not shown).

Furthermore, each support plate 2 is associated with damping means 9 (preferably comprising a pneumatic piston associated with each support plate 2) to determine the load to be transferred to the container C, i.e. to determine the compression load between each sealing head 3, 30 and the corresponding seal G caused by said vertical translation of the plates 2.

In the adjustment method described above, if the seal G is not being correctly pressed against the corresponding idle stop 3 (and therefore against the cap of the respective container C) during the sealing operations, the compression can be adjusted accordingly by acting on the damping means 9 to bring the compression value to an optimum value (within the range of reference values). In other words, the adjustment unit 7 can be linked to the damping means 9 associated with each plate 2, for example to each piston to adjust the travel thereof.

According to one embodiment, the detection and control unit 6 monitors operation of each electric motor 5 (i.e. the related operating parameters) such as to detect a parameter as a function of the current absorbed by each electric motor 5 (which is representative of the compression between the sealing head 3, 30 and the seal G of the container C).

For example, the detection and control unit 6 detects the power absorbed by each electric motor 5 (which is representative of the absorbed current).

In this case, where the adjustment method is used, the adjustment unit 7 can act on the damping means 9 (as mentioned above) to bring the compression value to an optimum value (within the range of reference values). In other words, the adjustment unit 7 can be linked to the damping means 9, as described above, associated with each support plate 2.

The invention also relates to a method for controlling a sealing machine 1 comprising a plurality of support plates 2 that are rotatable about themselves and that each support a container C and a plurality of sealing heads 3, 30 to press the seal G against a container C and to fasten the seal G to the container C. The container C is preferably provided with a cap (for example made of rubber or silicone).

The sealing machine 1 is preferably of the type described above, and reference should be made to the definitions provided above, including in relation to the proposed method.

The method according to the invention comprises the following steps:

placing the containers C, preferably already provided with an unfastened seal G, on the support plates 2, rotating the support plates 2, pressing the seal G against the container C and fastening the seal G to the container C using a sealing head 3, 30.

As mentioned above, the machine 1 is also intended to refer to a sealing station in a machine for filling and capping containers. For the sake of simplicity, reference shall henceforth in all cases be made to a sealing machine, meaning a machine that has at least one sealing station.

In particular, the step of rotating the support plates 2 is started by rotating each support plate 2 independently from the other support plates (preferably using an electric motor 5 associated with each plate 2, as described above).

Furthermore, the method also includes the following steps:

detecting at least one operating parameter associated with the rotation of each support plate 2 and/or with the compression load between each sealing head 3, 30 and the corresponding seal G, comparing the value of the at least one detected operating parameter with a reference value or a range of reference values, and Advantageously, the step of detecting at least one operating parameter associated with the rotation of each support plate 2 and/or the compression load enables sealing to be optimized (i.e. optimum fastening of a seal G on the related container C).

According to the preferred embodiment, the method also includes the step of sending a signal if the value of the detected parameter is different from the reference value or the range of reference values.

According to a possible embodiment, the method includes, after the signal sending step, the step of commanding the machine to stop, or alternatively the step of adjusting the rotation of a support plate 2 and/or the compression load between each sealing head 3, 30 and the corresponding seal G.

As mentioned above in the description of the machine 1, the step of commanding the machine to stop can be done manually (by an operator) or automatically (for example using the aforementioned detection and control device 6).

Where there is an adjustment step in response to the detection and control unit 6 detecting a parameter having a value different from the reference value or range of reference values, optimum sealing of each container C is guaranteed in any case.

According to a preferred embodiment, the operating parameter detected is the rotation speed of each plate 2 and/or the number of rotations of each support plate 2 required to complete the sealing operation.

In this case, where there is an adjustment step, the rotational speed of a plate 2 or the number of rotations to complete the sealing operations is adjusted if the detected parameter is different from the reference value or the range of reference values by acting on the individual plate 2. Preferably, the adjustment step is performed by acting on the individual electric motor 5 that moves the plate 2.

As mentioned above, it is also possible to act on the electric motor 5 to adjust the rotational speed of the support plates 2 during the sealing operation, for example by rotating a support plate 2 (and therefore the related container C) at a first speed when the related sealing blade 30 is moved from the related idle position to the operating position, and increasing the rotational speed to a second speed greater than the first speed once the sealing operation has been started. This helps to reduce the particulate matter caused by the blade dragging against the corresponding seal.

According to one embodiment, the detected operating parameter is the compression load between each sealing head 3, 30 and the corresponding seal G.

According to a first variant of this embodiment, the compression load can be detected using a load cell 4 associated with each sealing head 3, 30, preferably with the idle stop 3 of each sealing head 3, 30 (or a related support element).

As mentioned above, each support plate 2 can be movable vertically in Translation to move the related container C towards or away from the sealing head 3, 30 and the machine 1 can also have damping means 9 (not shown, each one preferably comprising a pneumatic piston) linked to each support plate 2, to determine the compression load between each sealing head 3, 30 and the corresponding seal G (caused by said vertical translational movement).

According to this variant, the adjustment step (where present) is performed by adjusting the damping means, preferably by adjusting the travel of each piston.

According to an alternative, the compression load can be detected as a function of the current absorbed by each electric motor 5. The current absorbed by each electric motor 5 is representative of the compression load between each sealing head 3, 30 and the corresponding seal. For example, the power absorbed by each electric motor 5 can be detected (see above with reference to the sealing machine 1).

Also in this alternative, the compression load adjustment step (where present) can be performed by acting on the damping means of the support plates 2 as described above, or by acting on the travel of each piston.

The machine and the method according to the invention enable each product (i.e. each product having a given type of container C, cap and seal G) to be associated with a predetermined series of mandatory operating parameters, thereby creating a genuine ad hoc "recipe" for each product.

The invention claimed is:

1. A controlling method of a sealing machine, the sealing machine including a plurality of support plates rotatable on themselves each for supporting a container with a cap, and a plurality of sealing heads to keep pressed a seal on the container and fixing the seal to the container, the method comprising the steps of:

placing containers capped and provided with the seal on the plurality of support plates;

rotating the plurality of support plates via electric motors associated with the support plates;

raising the plurality of support plates in translation via the electric motors to raise the containers capped and provided with the seal to the plurality of sealing heads;

keeping pressed the seal to the cap of a container of the containers and fixing the seal to the container by means of a sealing head of the plurality of sealing heads;

wherein the step of rotating the plurality of support plates is carried out rotating each support plate independently from the others of the plurality of support plates;

detecting at least one operating parameter associated with the rotation of each support plate and/or with a compression load between each sealing head of the plurality of sealing heads and the corresponding seal;

comparing a value of the at least one operating parameter detected with a reference value or a range of reference values;

wherein:

the at least one detected operating parameter is the compression load between each sealing head and the corresponding seal;

the step of rotating the support plates takes place by means of each electric motor which is independent from the other electric motors; and the step of detecting the compression load is performed by detecting a current absorbed by each electric motor; and based on the comparing, adjusting the compression load with damping means associated with each support plate, the damping means being separate from the electric motors and utilized once the electric motors raise the containers capped and provided with the seal to the plurality of sealing heads such that the adjusting of the compression load is performed after the containers capped and provided with the seal have been raised to the plurality of sealing heads.

2. The method according to claim 1, further comprising the step of:

sending a signal if the value of the at least one detected operating parameter is different from the reference value or from the range of reference values.

3. A controlling method of a sealing machine, the sealing machine including a plurality of support plates rotatable on themselves each for supporting a container with a cap, and a plurality of sealing heads to keep pressed a seal on the container and fixing the seal to the container, the method comprising the steps of:

placing containers capped and provided with the seal on the plurality of support plates;

rotating the plurality of support plates via electric motors associated with the support plates;

raising the plurality of support plates in translation via the electric motors to raise the containers capped and provided with the seal to the plurality of sealing heads;

keeping pressed the seal to the cap of a container of the containers and fixing the seal to the container by means of a sealing head of the plurality of sealing heads;

wherein the step of rotating the plurality of support plates is carried out rotating each support plate independently from the others of the plurality of support plates;

detecting at least one operating parameter associated with the rotation of each support plate and/or with a compression load between each sealing head of the plurality of sealing heads and the corresponding seal;

comparing a value of the at least one operating parameter detected with a reference value or a range of reference values;

sending a signal if the value of the at least one detected operating parameter is different from the reference value or from the range of reference values; and following the step of sending the signal, commanding a phase of adjusting the rotation of each support plate to include a first rotating speed prior to the fixing of the seal by the sealing head as the sealing head is moved to its operating position, and a second rotating speed greater than the first rotating speed upon commencing of the fixing the seal to the container;

wherein:

the at least one detected operating parameter is the compression load between each sealing head and the corresponding seal;

the step of rotating the support plates takes place by means of each electric motor which is independent from the other electric motors; and the step of detecting the compression load is performed by detecting a current absorbed by each electric motor; and based on the comparing, adjusting the compression load with damping means associated with each support plate.

* * * * *